(12) United States Patent
Abe (10) Patent No.: US 9,076,026 B2
(45) Date of Patent: Jul. 7, 2015

(54) BIOMETRIC INFORMATION PROCESSING APPARATUS AND BIOMETRIC INFORMATION PROCESSING METHOD

(71) Applicant: FUJITSU LIMITED, Kawasaki-shi, Kanagawa (JP)

(72) Inventor: Narishige Abe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/302,955

(22) Filed: Jun. 12, 2014

(65) Prior Publication Data

US 2014/0294261 A1  Oct. 2, 2014

Related U.S. Application Data

(63) Continuation of application No. PCT/JP2011/079081, filed on Dec. 15, 2011.

(51) Int. Cl.
*G06K 9/00* (2006.01)

(52) U.S. Cl.
CPC ........ *G06K 9/00067* (2013.01); *G06K 9/00006* (2013.01); *G06K 2009/00395* (2013.01)

(58) Field of Classification Search
CPC .......... G06K 9/00006; G06K 9/00067; G06K 2009/00395; G06K 9/00375; G06K 9/6272; G06K 2009/00959; G06K 2009/00966; G06K 9/00892; G06K 9/001; G06K 9/00093; G06K 9/0008; G06K 9/00073; G06K 9/00013; G06K 9/0002; G06K 9/00026; G06K 9/00033; G06K 9/0004; G06K 9/00053; G06K 2009/0006; G06K 9/00087; G06K 9/00107; G06K 9/00114; G06K 9/0012; G06K 2009/00932; G06K 2009/00953; H04N 1/442; G06T 2207/30196; A61B 5/117; A61B 5/1172; G06F 17/30784

See application file for complete search history.

(56) References Cited

U.S. PATENT DOCUMENTS

| | | | | |
|---|---|---|---|---|
| 6,198,836 | B1* | 3/2001 | Hauke | 382/125 |
| 6,323,846 | B1* | 11/2001 | Westerman et al. | 345/173 |
| 8,522,308 | B2* | 8/2013 | Stinson, III | 726/2 |
| 2012/0274596 | A1* | 11/2012 | Ludwig | 345/173 |
| 2012/0281884 | A1* | 11/2012 | Whillock et al. | 382/115 |

FOREIGN PATENT DOCUMENTS

| JP | 8-161490 | 6/1996 |
|---|---|---|
| JP | 11-514771 | 12/1999 |

(Continued)

OTHER PUBLICATIONS

International Search Report mailed Jan. 17, 2012 in corresponding International Patent Application No. PCT/JP2011/079081.

*Primary Examiner* — Edward Park
(74) *Attorney, Agent, or Firm* — Staas & Halsey LLP (57) ABSTRACT

A biometric information processing apparatus includes: a biometric information acquiring unit which generates a biometric image representing biometric information of a plurality of fingers of a user; and a processor adapted to extract a biometric region capturing biometric information of each of the plurality of fingers in the biometric image; obtain the first distance between the biometric regions corresponding to two adjacent fingers of the plurality of fingers; and estimate an angle of spread between the two adjacent fingers according to a ratio of a value obtained by subtracting a distance between bases of the two fingers from the first distance, to a length from a base of one of the two adjacent fingers to the biometric information.

11 Claims, 5 Drawing Sheets

(56) References Cited

FOREIGN PATENT DOCUMENTS

| JP | 2002-117405 | 4/2002 |
| JP | 2004-102446 | 4/2004 |
| JP | 2004-246459 | 9/2004 |
| JP | 2005-25414 | 1/2005 |

* cited by examiner

BIOMETRIC INFORMATION PROCESSING APPARATUS AND BIOMETRIC INFORMATION PROCESSING METHOD

CROSS-REFERENCE TO RELATED APPLICATION

This application is a continuation application and is based upon PCT/JP2011/079081, filed on Dec. 15, 2011, the entire contents of which are incorporated herein by reference.

FIELD

The embodiments discussed herein are related to a biometric information processing apparatus, a biometric information processing method, and a computer program for biometric information processing that use, for biometric authentication, images representing biometric information of each of a plurality of fingers.

BACKGROUND

Recent years have seen development of biometric authentication technology for determining whether or not to authenticate an individual, by using biometric information such as a fingerprint and a finger vein pattern. The biometric authentication technology is widely used from large-scale systems with a number of registered users such as an access control system, a border control system, and a system using national identification numbers, to devices used by particular individuals such as a computer and a mobile terminal.

For example, when a fingerprint of any of finger is used as biometric information, a biometric authentication apparatus acquires a biometric image representing the fingerprint as an input biometric image. Then, the biometric authentication apparatus matches the input biometric information, which is a user's fingerprint represented in the input biometric image, with registered biometric information, which is a fingerprint stored in advance in the form of a biometric image for each registered user. Based on a result of the matching process, when determining that the input biometric information matches the registered biometric information, the biometric authentication apparatus authenticates the user as being a legitimate registered user. The biometric authentication apparatus then permits the authenticated user to use an apparatus in which the biometric authentication apparatus is incorporated or other apparatus connected to the biometric authentication apparatus.

Some biometric authentication apparatuses include a sensor that is large enough to be able to acquire biometric information of each of a plurality of fingers at a time. A biometric authentication apparatus using such a sensor is capable of using biometric information of a plurality of fingers. However, in some cases, a degree of spread between fingers held to the sensor when a user registers biometric information of fingers on the biometric authentication apparatus (hereinafter referred to simply as "at the time of registration") is different from a degree of spread between fingers held to the sensor when the user asks for authentication (hereinafter referred to as "at the time of matching"). In such a case, for example, a feature of each finger extracted from a biometric image generated at the time of matching may be different from a feature of each finger extracted from a biometric image generated at the time of registration, consequently decreasing an authentication rate.

Meanwhile, techniques have been proposed for detecting or correcting difference in the rotation direction between biometric information of a finger on a biometric image acquired at the time of registration and biometric information of a finger on a biometric image acquired at the time of matching, by analyzing the biometric images (refer to, for example, Japanese Laid-open Patent Publication No. 2004-246459, Japanese Laid-open Patent Publication No. 2005-25414, Japanese Laid-open Patent Publication No. 2002-117405, and Published Japanese Translation of PCT International Publication for Patent Application (Kohyo) No. H11-514771).

For example, Japanese Laid-open Patent Publication No. 2004-246459 discloses a method of calculating an angle of rotational difference between fingerprint images. In this method, an amount of positional difference in each of the x direction and the y direction between two fingerprint images to be matched is obtained, and, after determining the center of one of the fingerprint images, the center of the other fingerprint image is corrected using the obtained amount of difference. Then, in this method, spectral patterns in the rotation direction are obtained from one fingerprint image and the other fingerprint image corrected, and matching is performed between the spectral patterns in the rotation direction by moving one of the patterns, thereby an angle of rotational difference between the two fingerprint images is obtained.

Japanese Laid-open Patent Publication No. 2005-25414 discloses a technique of successively reading, for every certain angle, a fingerprint image for matching, selecting an image having an angle of a finger approximately the same as that of a registered image stored in advance, from the plurality of images for matching read, and then performing matching with a registered image.

Japanese Laid-open Patent Publication No. 2002-117405 discloses a palm-shape authentication method of detecting a rotation angle of a palm from palm-shape image data, correcting positional difference with a rotation angle of a registered palm in a registered palm-shape image being registered in advance by detecting a palm shape of a user, and then, performing matching between the palm-shape image and the registered palm-shape image.

Published Japanese Translation of PCT International Publication for Patent Application (Kohyo) No. H11-514771 discloses a fingerprint-image identification method of obtaining a longitudinal axis of each of at least two fingers positioned side by side by detecting a centroidal line of a fingerprint image, and obtaining angles of orientation of the centroidal lines and difference between the angles of orientation.

SUMMARY

In the methods disclosed in Japanese Laid-open Patent Publication No. 2004-246459 and Japanese Laid-open Patent Publication No. 2005-25414, a rotation angle of a finger may not be accurately corrected when biometric information of the finger is not captured clearly to some extent on a biometric image. However, for example, when a user does not appropriately place any finger against a sensor at the time of matching, biometric information of the finger is not clear on the biometric image, or only part of the biometric information is captured, in some cases.

Further, the method disclosed in Japanese Laid-open Patent Publication No. 2002-117405 is for obtaining a rotation angle of the entire palm, and may not be used to correct a degree of spread between adjacent fingers. Further, in the method disclosed in Published Japanese Translation of PCT International Publication for Patent Application (Kohyo) No. H11-514771, an angle of spread representing a degree of spread between two adjacent fingers is calculated according to a model in which the two fingers open and close while having a single point as an axis. However, in practice, a human finger rotates while having the base of the finger as an axis. For example, when a user moves two adjacent fingers so as to be put together as close as possible, a distance between the fingers at the tip parts of the fingers is smaller than a distance between the fingers at the base parts of the fingers, in some cases. In the method disclosed in Published Japanese Translation of PCT International Publication for Patent Application (Kohyo) No. H11-514771, since it is not possible to express a state in which a distance between the fingers at the tip parts of the fingers is smaller than a distance between the fingers at the base parts of the fingers, a degree of spread between the fingers is not obtained accurately in some cases.

According to one embodiment, a biometric information processing apparatus is provided. The biometric information processing apparatus includes: a biometric information acquiring unit which generates a biometric image representing biometric information of a plurality of fingers of a user; and a processer adapted to extract a biometric region capturing biometric information of each of the plurality of fingers in the biometric image; obtain a first distance between the biometric regions corresponding to two adjacent fingers of the plurality of fingers; and estimate an angle of spread between the two adjacent fingers, depending on a ratio of a value obtained by subtracting a distance between bases of the two adjacent fingers from the first distance, to a length from a base of one of the two adjacent fingers to the biometric information of the finger.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In the following, a biometric information processing apparatus according to an embodiment will be described with reference to the drawings.

The biometric information processing apparatus uses, for biometric authentication, a biometric image capturing biometric information of each of a plurality of fingers of a user. The biometric information processing apparatus detects, for each finger, a biometric region capturing biometric information of the finger, from a biometric image acquired at the time of registration or matching of biometric information of each finger and representing biometric information of each finger. Then, the biometric information processing apparatus estimates an angle of spread between two adjacent fingers, based on a ratio of a value obtained by subtracting a distance between bases of the two fingers from a distance between biometric regions of the two fingers, to a distance from the base of the finger to the biometric information of the finger.

In the present embodiment, the biometric information processing apparatus uses a fingerprint as the biometric information of a finger to be subjected to biometric authentication. Further, assume that the biometric image captures at least three fingers including the index finger, the middle finger, and the ring finger.

In this specification, the term "matching process" is used to refer to a process for calculating a metric that indicates a degree of difference or a degree of similarity between biometric information of a user and biometric information of a registered user. Further, the term "biometric authentication process" is used to refer to the entire authentication process that includes not only the matching process but also a process for determining whether or not to authenticate the user by using the metric obtained by the matching process.

Figure 1:
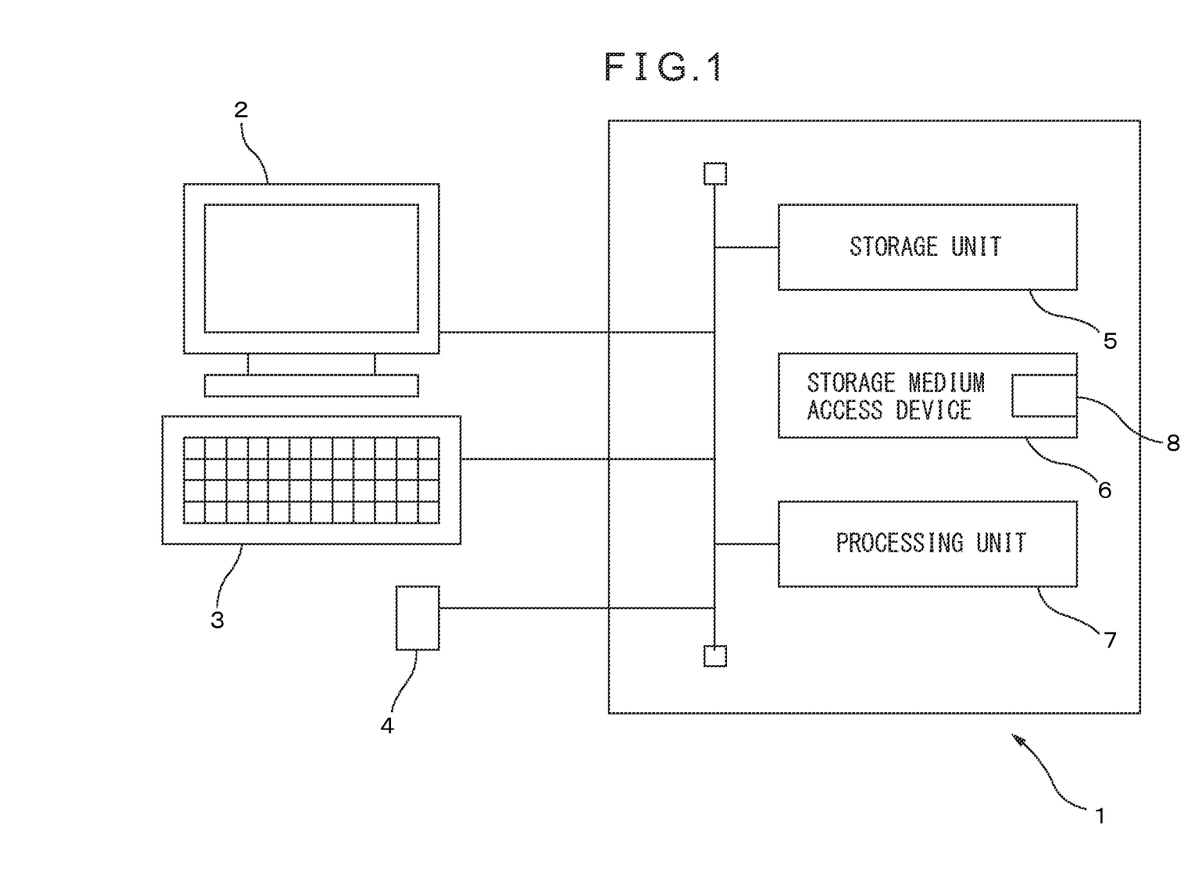
FIG. 1 is a schematic diagram illustrating a configuration of a biometric authentication apparatus as an embodiment of a biometric information processing apparatus.

FIG. 1 is a schematic diagram illustrating a configuration of a biometric authentication apparatus as a first embodiment of the biometric information processing apparatus. As illustrated in FIG. 1, a biometric authentication apparatus 1 includes a display unit 2, an input unit 3, a biometric information acquiring unit 4, a storage unit 5, a storage medium access device 6, and a processing unit 7. The display unit 2, the input unit 3, and the biometric information acquiring unit 4 may be provided separately from a cabinet containing the storage unit 5, the storage medium access device 6, and the processing unit 7.

The biometric authentication apparatus 1 carries out, by using a biometric image representing fingerprints of a user's fingers generated by the biometric information acquiring unit 4, the biometric authentication process by performing matching on the fingerprints with fingerprints of a registered user. When authenticating the user as being one of the registered users as a result of the biometric authentication process, the biometric authentication apparatus 1 permits the user to use an apparatus in which the biometric authentication apparatus 1 is incorporated. Alternatively, the biometric authentication apparatus 1 transmits, to a different apparatus (not depicted) a signal indicating that the user is authenticated, and permits the user to use the different apparatus.

The display unit 2 includes a display device such as a liquid crystal display and an organic electroluminescence display, for example. The display unit 2 displays, for a user, a guidance message for directing the user to place fingers so that the biometric information acquiring unit 4 may acquire a biometric image with little distortion of the biometric information, for example. The display unit 2 also displays a message indicating a result of the biometric authentication process carried out by the processing unit 7, various kinds of information associated with an application, or the like.

The input unit 3 includes a user interface such as a keyboard, a mouse, and a touch pad, for example. User authentication information such as a user name, a command, or data, entered via the input unit 3 by a user is passed to the processing unit 7. However, when a user does not need to enter information other than the biometric information to the biometric authentication apparatus 1, the input unit 3 may be omitted.

The biometric information acquiring unit 4 includes a fingerprint sensor using an area sensor capable of simultaneously capturing an image of a plurality of fingers, for example. The fingerprint sensor may be any one of an optical sensor, a capacitance sensor, an electric field sensor, and a thermal sensor, for example. While a user places a plurality of fingers on a sensor surface of the fingerprint sensor, the biometric information acquiring unit 4 captures an image of surfaces of the plurality of fingers, and thereby generates a biometric image representing fingerprints of the respective fingers. In the present embodiment, it is assumed that brightness of a pixel in a background region, which does not capture any fingers in the biometric image, is high, while brightness of a pixel in a biometric region, which captures a finger, is low. However, the biometric information acquiring unit 4 may generate a biometric image so that brightness of a pixel in the background region would be lower than brightness of a pixel in the biometric region.

The biometric information acquiring unit 4 may include a slide-type fingerprint sensor. In this case, the biometric information acquiring unit 4 sequentially generates a partial image at a predetermined time interval while a plurality of fingers are being slid on the fingerprint sensor. A partial image captures a part of a fingerprint on a surface of each finger, and a composite biometric image capturing the entire fingerprint of each finger is created by joining the plurality of partial images in order of generation time.

In the present embodiment, a biometric image is generated so that a user's wrist side would be on the lower edge of the biometric image while the user's finger-tip side would be on the upper edge of the biometric image.

Every time a biometric image is generated, the biometric information acquiring unit 4 passes the biometric image to the processing unit 7.

The storage unit 5 includes, for example, at least one of a semiconductor memory, a magnetic disk device, and an optical disk device. The storage unit 5 stores an application program to be used in the biometric authentication apparatus 1, a user name, a user identification number, and personal setting information of at least one registered user, various kinds of data, and the like. The storage unit 5 also stores a program for carrying out the biometric authentication process. Further, for each registered user, the storage unit 5 stores data on fingerprints of a plurality of particular fingers as the registered biometric information of the registered user, along with identification information of the registered user such as a user name and a password of the registered user. The data on the registered biometric information includes feature information of the registered biometric information, for example. The feature information includes, for example, a kind and a position of each minutia such as a ridge ending and a ridge bifurcation of each finger and a local ridge direction, extracted from the registered biometric image as a biometric image representing the registered biometric information. The feature information may also include relative positional relationship between a plurality of fingers in the registered biometric image such as a distance between the fingertips. Alternatively, the data on the registered biometric information may be the entire registered biometric image or a part of the registered biometric image.

The storage medium access device 6 is a device for accessing a storage medium 8 such as a magnetic disk, a semiconductor memory card, and an optical storage medium, for example. The storage medium access device 6 reads out a biometric information processing computer program that is stored in the storage medium 8 and to be executed on the processing unit 7, for example, and then passes the computer program to the processing unit 7 or causes the storage unit 5 to store the computer program.

The processing unit 7 includes one or more processors and peripheral circuits thereof. The processing unit 7 detects distortion of the biometric information represented in the biometric image acquired from the biometric information acquiring unit 4. When the distortion of the biometric information is small, the processing unit 7 carries out the biometric authentication process or the registration process using the biometric image.

Figure 2:
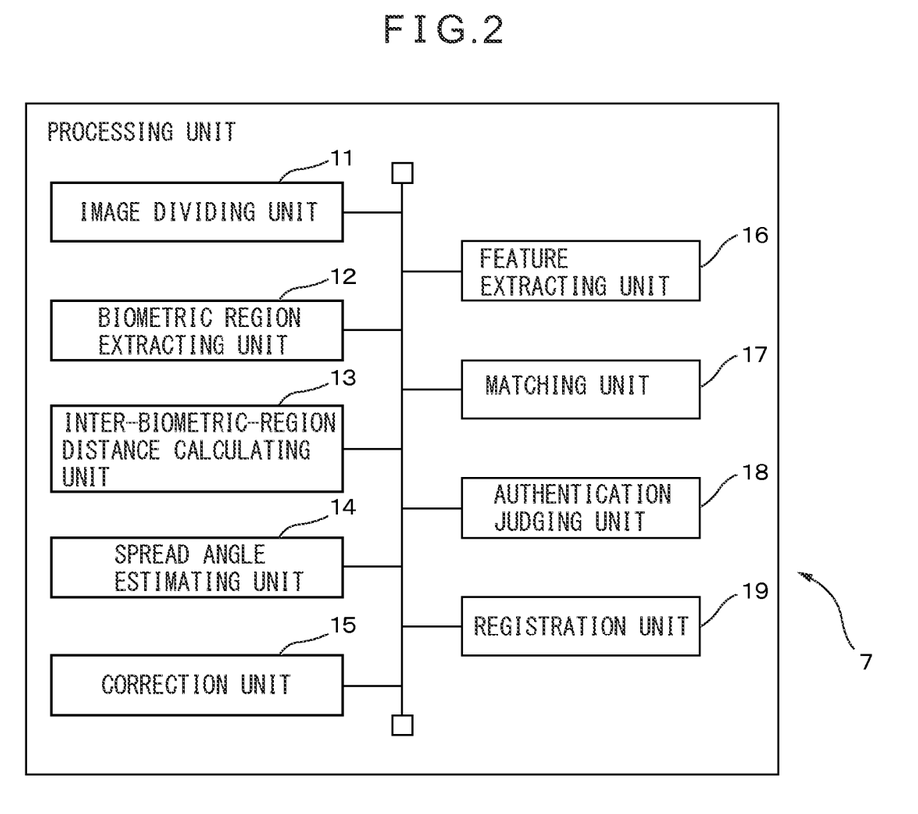
FIG. 2 is a functional block diagram of a processing unit according to an embodiment.

FIG. 2 is a functional block diagram of the processing unit 7. As illustrated in FIG. 2, the processing unit 7 includes an image dividing unit 11, a biometric region extracting unit 12, an inter-biometric-region distance calculating unit 13, a spread angle estimating unit 14, a correction unit 15, a feature extracting unit 16, a matching unit 17, an authentication judging unit 18, and a registration unit 19. These units constituting the processing unit 7 are functional modules implemented by executing a computer program on a processor contained in the processing unit 7. Alternatively, these units constituting the processing unit 7 may be implemented as firmware on the biometric authentication apparatus 1.

The image dividing unit 11, the biometric region extracting unit 12, the inter-biometric-region distance calculating unit 13, the spread angle estimating unit 14, the correction unit 15, and the feature extracting unit 16 are used in both the biometric authentication process and the registration process. The matching unit 17 and the authentication judging unit 18 are used in the biometric authentication process, while the registration unit 19 is used in the registration process.

The image dividing unit 11 divides the biometric image received from the biometric information acquiring unit 4, into a grid of M blocks horizontally and N blocks vertically (where M and N are integers not smaller than 2). In the present embodiment, each block has rectangular geometry, and is set at a size corresponding to a part of a finger captured in the biometric image, for example, a size of 32 pixels vertically× 32 pixels horizontally. The image dividing unit 11 notifies the biometric region extracting unit 12 of information indicating a position of each block, for example, coordinates of a dividing line between blocks or coordinates of the upper left end and the lower right end of each block.

The biometric region extracting unit 12 extracts a biometric block capturing a part of the fingerprint, among a plurality of blocks, joins biometric blocks each capturing a part of the fingerprint of the same finger, and thereby extracts a biometric region as a region capturing the fingerprint of the finger.

In the present embodiment, when a predetermined number of or more pixels each having brightness lower than a predetermined brightness threshold value Th1 are included in a block, the biometric region extracting unit 12 determines that the block captures a part of a fingerprint. The brightness threshold value Th1 is set at the average brightness value of the entire biometric image, for example. Alternatively, when a brightness value of a pixel included in the background region in the biometric image is the maximum value (for example, 255) possible for a brightness value of a pixel of the biometric image to take, the brightness threshold value Th1 may be set at a value obtained by subtracting a predetermined offset value (for example, 10) from the maximum brightness value. The predetermined number is set at a number corresponding to 1/20 to 1/2 of the total number of pixels included in a block, for example.

The biometric region extracting unit 12 performs labeling process on biometric blocks, and labels a block group obtained by joining adjacent biometric blocks, as a single biometric region.

The inter-biometric-region distance calculating unit 13 calculates a distance between biometric regions of two adjacent fingers. In the present embodiment, a distance between biometric regions is calculated as a distance between reference points of the respective biometric regions. The reference point of a biometric region is preferably set at a point located on or near the center line dividing a width of a finger approximately into two halves. The reference point may be set at the barycenter of a biometric region, for example. In this case, the inter-biometric-region distance calculating unit 13 extracts pixels each having brightness lower than the brightness threshold value Th1, from each biometric block included in the biometric region, and sets the barycenter of the extracted pixels as the barycenter of the biometric region, for example.

Alternatively, the inter-biometric-region distance calculating unit 13 may set, as a reference point, a feature point included in biometric information of a finger, for example, a singular point from which a change in the ridge direction becomes large locally, such as the center of vortex of the fingerprint. In this case, the inter-biometric-region distance calculating unit 13 obtains, for each biometric region, a ridge direction for each block included in the biometric region, and sets, as the reference point, the middle point of the dividing line of two adjacent blocks between which the ridge direction changes most, for example.

To obtain a ridge direction for each block, the inter-biometric-region distance calculating unit 13 uses, for example, an edge detection filter such as a Sobel filter or a Prewitt filter, for each pixel in the block, and obtains a horizontal edge strength $\partial_x(u, v)$ and a vertical edge strength $\partial_y(u, v)$. The letters u and v denote a horizontal coordinate and a vertical coordinate of the pixel in the block, respectively.

The inter-biometric-region distance calculating unit 13 calculates a ridge direction of each block according to the following equations.

$$\theta(i, j) = \frac{1}{2}\tan^{-1}\left(\frac{V_y(i, j)}{V_x(i, j)}\right) \quad (1)$$

$$V_x(i, j) = \sum_{u=b(i-1)}^{bi-1} \sum_{v=b(j-1)}^{bj-1} 2\partial_x(u, v)\partial_y(u, v),$$

$$V_y(i, j) = \sum_{u=b(i-1)}^{bi-1} \sum_{v=b(j-1)}^{bj-1} \partial_x^2(u, v)\partial_y^2(u, v)$$

In the above equations, i(i=1, 2, ..., M) and j(j=1, 2, ..., N) respectively denote the number of blocks from the left edge of the biometric image and the number of blocks from the upper edge of the biometric image. Further, b denotes a horizontal size and a vertical size (in a unit of pixel) of each block. Then, θ(i, j) denotes a ridge direction of the block that is the i-th from the left edge horizontally and j-th from the upper edge vertically (hereinafter referred to as a block (i, j), for convenience).

Alternatively, the inter-biometric-region distance calculating unit 13 may check, for each block, frequency components of various directions by frequency conversion, and obtain a direction having the frequency component corresponding to an interval between ridges being the highest. The direction having the frequency component corresponding to the interval between ridges being the highest is estimated to be a direction orthogonal to the ridges. Hence, the inter-biometric-region distance calculating unit 13 may set, as the ridge direction, a direction orthogonal to the direction having the frequency component corresponding to the interval between ridges being the highest.

The inter-biometric-region distance calculating unit 13 calculates, for each pair of two adjacent biometric regions, a distance between reference points of the respective biometric regions.

The spread angle estimating unit 14 calculates an angle of spread between two adjacent fingers depending on a distance between the reference points of the biometric regions corresponding to the two respective fingers. In the present embodiment, the angle of spread is calculated taking into consideration that each finger rotates about the base of the finger and that the bases of the fingers are apart.

Figure 3A:
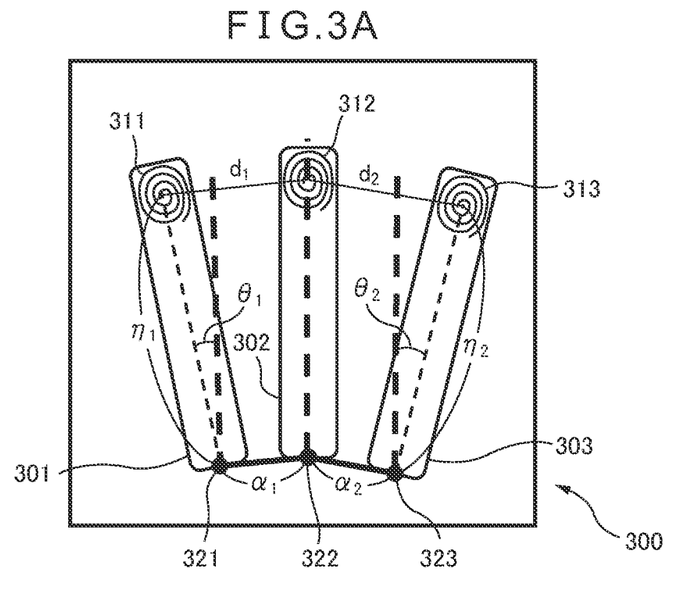
FIG. 3A is a diagram illustrating relationship between a biometric region of each finger on a biometric image with spread fingers and a model of fingers.
Figure 3B:
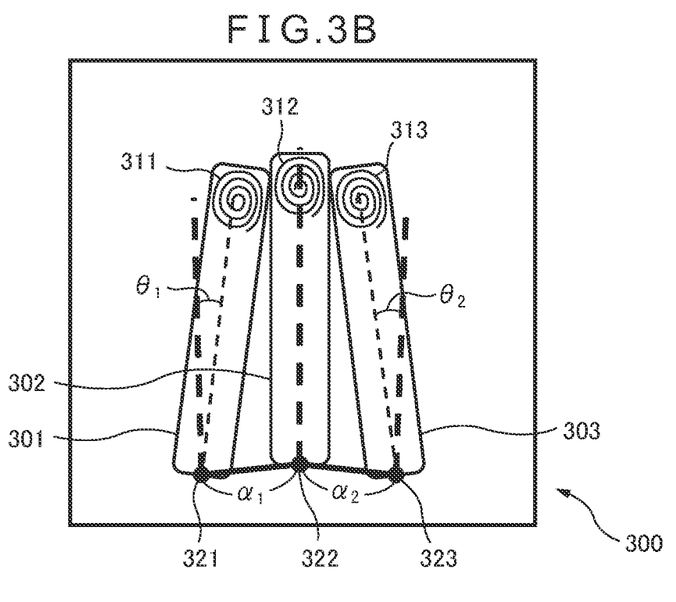
FIG. 3B is a diagram illustrating relationship between a biometric region of each finger on a biometric image with closed fingers and a model of fingers.

FIG. 3A is a diagram illustrating relationship between a biometric region of each finger in a biometric image with spread fingers and a model of fingers. By contrast, FIG. 3B is a diagram illustrating relationship between a biometric region of each finger in a biometric image with closed fingers and a model of fingers. In FIG. 3A and FIG. 3B, a biometric image 300 includes biometric regions 311 to 313 of three fingers 301 to 303, for example, the index finger, the middle finger, and the ring finger. A distance between the reference points of the biometric region 311 and the biometric region 312 adjacent to each other is denoted by $d_1$, while a distance between the reference points of the biometric region 312 and the biometric region 313 adjacent to each other is denoted by $d_2$.

Each finger rotates about a base of the finger 321 to 323, respectively. The rotation centers 321 to 323 are apart from each other respectively by the number $\alpha_1$ and by the number $\alpha_2$ of pixels corresponding to a width of a finger on the biometric image 300. Accordingly, when the fingers 301 to 303 are in parallel, a distance between the reference points of the biometric region 311 and the biometric region 312 is also approximately $\alpha_1$, and a distance between the reference points of the biometric region 312 and the biometric region 313 is also approximately $\alpha_2$. Hence, an angle of spread $\theta_1$ between the finger 301 and the finger 302 and an angle of spread $\theta_2$ between the finger 302 and the finger 303 are represented approximately by the following equations.

$$\theta_1 = \frac{(d_1 - \alpha_1)}{\eta_1} \quad (2)$$

$$\theta_2 = \frac{(d_2 - \alpha_2)}{\eta_2}$$

In the above equations, $\eta_1$ denotes the number of pixels corresponding to a length from the base of the finger 301 to the reference point of the biometric information of the finger 301 in the biometric image 300, and $\eta_2$ denotes the number of pixels corresponding to a length from the base of the finger 303 to the reference point of the biometric information of the finger 303 in the biometric image 300. Each of the angles of spread $\theta_1$ and $\theta_2$ is set to have a positive value when adjacent fingers are spread out. For example, as for the finger 301 corresponding to the biometric region 311 captured on the left side in the biometric image 300 and the finger 302 corresponding to the biometric region 312 captured at the center, $\theta_1$ takes a positive value when the biometric region 311 is positioned on the left of the center line of the finger 301 while the longitudinal direction of the finger 301 is in parallel with the longitudinal direction of the finger 302. Meanwhile, as for the finger 302 and the finger 303 corresponding to the biometric region 313 captured on the right side in the biometric image 300, $\theta_2$ takes a positive value when the biometric region 313 is positioned on the right of the center line of the finger 303 while the longitudinal direction of the finger 303 is in parallel with the longitudinal direction of the finger 302. Note that in some cases, as illustrated in FIG. 3B, each of the angles of spread $\theta_1$ and $\theta_2$ may take a negative value when fingers are put together.

The spread angle estimating unit 14 estimates an angle of spread between two adjacent fingers according to Equations (2) given above. Each of $\alpha_1$, $\alpha_2$, $\eta_1$, and $\eta_2$ is, for example, obtained in advance as the number of pixels corresponding to the average value of measured values of a distance between the bases of adjacent fingers and a length of the finger of a plurality of individuals, and is stored in the storage unit 5. When fingers captured in a biometric image are three fingers that are the index finger, the middle finger, and the ring finger, difference between a distance from the index finger to the middle finger and a distance from the middle finger to the ring finger is small enough not to affect accuracy of feature extraction. Therefore, $\alpha_1$ and $\alpha_2$ may be set at the same value. Similarly, difference between a length of the index finger and a length of the ring finger is small enough not to affect accuracy of feature extraction. Therefore, $\eta_1$ and $\eta_2$ may be set at the same value.

The spread angle estimating unit 14 passes the angles of spread $\theta_1$ and $\theta_2$ to the correction unit 15.

The correction unit 15 rotates at least one of biometric regions corresponding to two adjacent fingers to cancel out difference between the estimated angle of spread and the reference angle so that the angle of spread between the biometric regions would be equal to the reference angle. For example, assume, as described above, that three fingers are captured in a biometric image, an angle of spread between a finger to the left and a finger in the middle is denoted by $\theta_1$ while an angle of spread between the finger in the middle and a finger to the right is denoted by $\theta_2$, and the reference angle is 0°. In this case, the correction unit 15 rotates the biometric region on the left side in the biometric image, by $(-\theta_1)$ about the reference point of the biometric region, by using affine transformation, for example. Similarly, the correction unit 15 rotates the biometric region on the right side in the biometric image, by $(-\theta_2)$ about the reference point of the biometric region, by using affine transformation, for example. Alternatively, the correction unit 15 may estimate a position of the base of the finger for which the biometric region is to be rotated, and use the estimated position as the rotation center. For example, the correction unit 15 may estimate, as a position of the base of the finger to the left, a pixel that is positioned below the reference point of the biometric region of the finger in the middle by the number $\eta$ of pixels corresponding to the estimated length from the reference point to the base of the finger, and positioned to the left by $\alpha_1$. Similarly, the correction unit 15 may estimate, as a position of the base of the finger to the right, a pixel that is positioned below the reference point of the biometric region of the finger in the middle by the number $\eta$ of pixels and positioned to the right by $\alpha_2$.

When the number of fingers captured in a biometric image is two, the correction unit 15 may rotate the biometric regions of both of the two adjacent fingers, by half of difference between the estimated angle of spread and the reference angle.

The correction unit 15 passes the biometric image in which the biometric regions are corrected, to the feature extracting unit 16.

The feature extracting unit 16 extracts a feature of the biometric information of each finger, from the corrected biometric image. In the present embodiment, the feature extracting unit 16 obtains, as a feature, a position of minutia, which is a characteristic structure of a fingerprint such as a ridge bifurcation and a ridge ending, for example. For this purpose, the feature extracting unit 16 binarizes a brightness value of each pixel of the corrected biometric image to differentiate pixels representing a ridge and pixels representing a valley, for example. A threshold value for the binarization may be set at the average value of brightness values of pixels included in a biometric region, for example. Then, the feature extracting unit 16 applies thinning to pixels having brightness values corresponding to a ridge in the binarized biometric image, thus thinning a line obtained by joining pixels representing the ridge to form a line having a width of one pixel, for example. The feature extracting unit 16 then scans the thinned biometric image by using a plurality of mask patterns, which have binary patterns corresponding to a ridge bifurcation or a ridge ending, and detects a position matching one of the mask patterns on the biometric image. Then, the feature extracting unit 16 extracts a pixel at the center of the detected position as a minutia, and determines a type of minutia (i.e., bifurcation or ending) indicated by the matched mask pattern to be a type of the detected minutia.

The feature extracting unit 16 may extract a minutia from a biometric image by using other known method that obtains a ridge ending or a ridge bifurcation as a minutia. Further, the feature extracting unit 16 may obtain a ridge direction of each block of the biometric image as a feature.

The feature extracting unit 16 stores, in the storage unit 5, feature information including features such as the total number of extracted minutiae, an identification number, a type, and a position on the biometric image of each minutia, and/or a ridge direction, in association with the biometric image. The identification number assigned to each minutia may be a serial number starting from 1 in sequence from a minutia closest to the upper left edge of the biometric image, for example.

Further, when a reference point of a biometric region is a singular point of the fingerprint, the feature extracting unit 16 may calculate a directional vector from the reference point to each minutia, as a feature.

At the time of matching, the feature extracting unit 16 passes the extracted feature quantities to the matching unit 17. At the time of registration, the feature extracting unit 16 passes the extracted feature quantities to the registration unit 19.

The matching unit 17 calculates a degree of similarity between input biometric information, which is biometric information of each of a plurality of fingers captured in the biometric image of the user acquired at the time of matching, and registered biometric information, which is biometric information of a corresponding finger of the registered user captured in the registered biometric image of the registered user identified by the user identification information entered via the input unit 3.

The matching unit 17 calculates a degree of similarity by minutia matching, for example. In this case, the matching unit 17 aligns one of minutiae of a target finger included in the feature information, with one of minutiae of the corresponding finger extracted from the registered biometric image, for example. Then, the matching unit 17 obtains the number of matching between other minutiae in the feature information and minutiae extracted from the registered biometric image. When a distance between two minutiae is, for example, smaller than or equal to a distance between ridges, the matching unit 17 determines that the two minutiae match. Alternatively, the matching unit 17 may determine, only when two types of minutiae are the same, that the two minutiae match.

Further, the matching unit 17 may determine, as long as an angle between directional vectors of two minutiae from the reference point is smaller than or equal to a predetermined angle (for example, 10°), that the two minutiae match.

The matching unit 17 obtains, for each finger, the number of matching between minutiae in the input biometric information and minutiae in the registered biometric information by changing a pair of minutiae to be aligned. Then, the matching unit 17 obtains the maximum value of the ratio of the number of matching minutiae to the total number of minutiae in the input biometric information. Then, the matching unit 17 determines a degree of similarity by taking the average value of the maximum values of the ratios of each finger or the largest value of the maximum values of the ratios of each finger.

Alternatively, the matching unit 17 may calculate a degree of similarity by performing pattern matching between the corrected biometric image of the user and the registered biometric image capturing the registered biometric information. In this case, the matching unit 17 obtains normalized cross-correlation coefficients by changing relative positions of the biometric image of the user and the registered biometric image, and calculates the maximum value of the normalized cross-correlation values as a similarity value. In this case, the feature extracting unit 16 may be omitted.

The matching unit 17 passes, to the authentication judging unit 18, the degree of similarity along with the identification information of the registered user.

When no identification information of the user is entered, the matching unit 17 obtains a degree of similarity of the fingerprint respectively for each registered user. Then, the matching unit 17 selects a registered user having the maximum degree of similarity of the fingerprint. The matching unit 17 then passes, to the authentication judging unit 18, the maximum value of the degree of similarity and identification information of the registered user corresponding to the maximum value.

The authentication judging unit 18 determines whether the user is authenticated as the registered user or not by comparing the degree of similarity with an authentication judging threshold value. For example, when the degree of similarity is larger than or equal to the authentication judging value, the authentication judging unit 18 determines that the biometric information of the user captured in the biometric image and the biometric information of the registered user match. Then, the authentication judging unit 18 authenticates the user as the registered user. After authenticating the user, the authentication judging unit 18 notifies the processing unit 7 of the result of authentication. Then, the processing unit 7 permits the authenticated user to use an apparatus in which the biometric authentication apparatus 1 is incorporated or an apparatus connected to the biometric authentication apparatus 1.

On the other hand, when the degree of similarity is smaller than the authentication judging threshold value, the authentication judging unit 18 does not authenticate the user, and notifies the processing unit 7 that the user is not authenticated. In this case, the processing unit 7 forbids the user who is not authenticated, to use an apparatus in which the biometric authentication apparatus 1 is incorporated or an apparatus connected to the biometric authentication apparatus 1. The processing unit 7 may also cause the display unit 2 to display a message indicating that the authentication fails.

It is preferable to set the authentication judging threshold value to such a value that the authentication judging unit 18 succeeds to authenticate the user only when the user is the registered user. It is also preferable to set the authentication judging threshold value to such a value that the authentication judging unit 18 fails to authenticate the user when the user is a person other than the registered user. For example, the authentication judging threshold value may be set at a value calculated by multiplying the difference between the maximum value and the minimum value that the degree of similarity can take by 0.7, and by adding the resulting product to the minimum value of the degree of similarity.

At the time of carrying out the registration process, the registration unit 19 stores, in the storage unit 5, the identification information of the user entered via the input unit 3, along with the feature information extracted by the feature extracting unit 16. When the matching unit 17 obtains a degree of similarity by pattern matching, the registration unit 19 stores, in the storage unit 5, the biometric image corrected by the correction unit 15, or a rectangular area outwardly adjacent to each biometric region in the corrected biometric image, along with the identification information of the user. The user is thus registered as the registered user who is permitted to use an apparatus in which the biometric authentication apparatus 1 is incorporated.

Alternatively, the registration unit 19 may store, in the storage unit 5, the identification information of the user entered via the input unit 3, along with the feature information extracted by the feature extracting unit 16 and the angle of spread between adjacent fingers. In this case, the stored angle of spread is used as a reference angle when the correction unit 15 corrects a biometric region of each finger at the time of matching.

Figure 4:
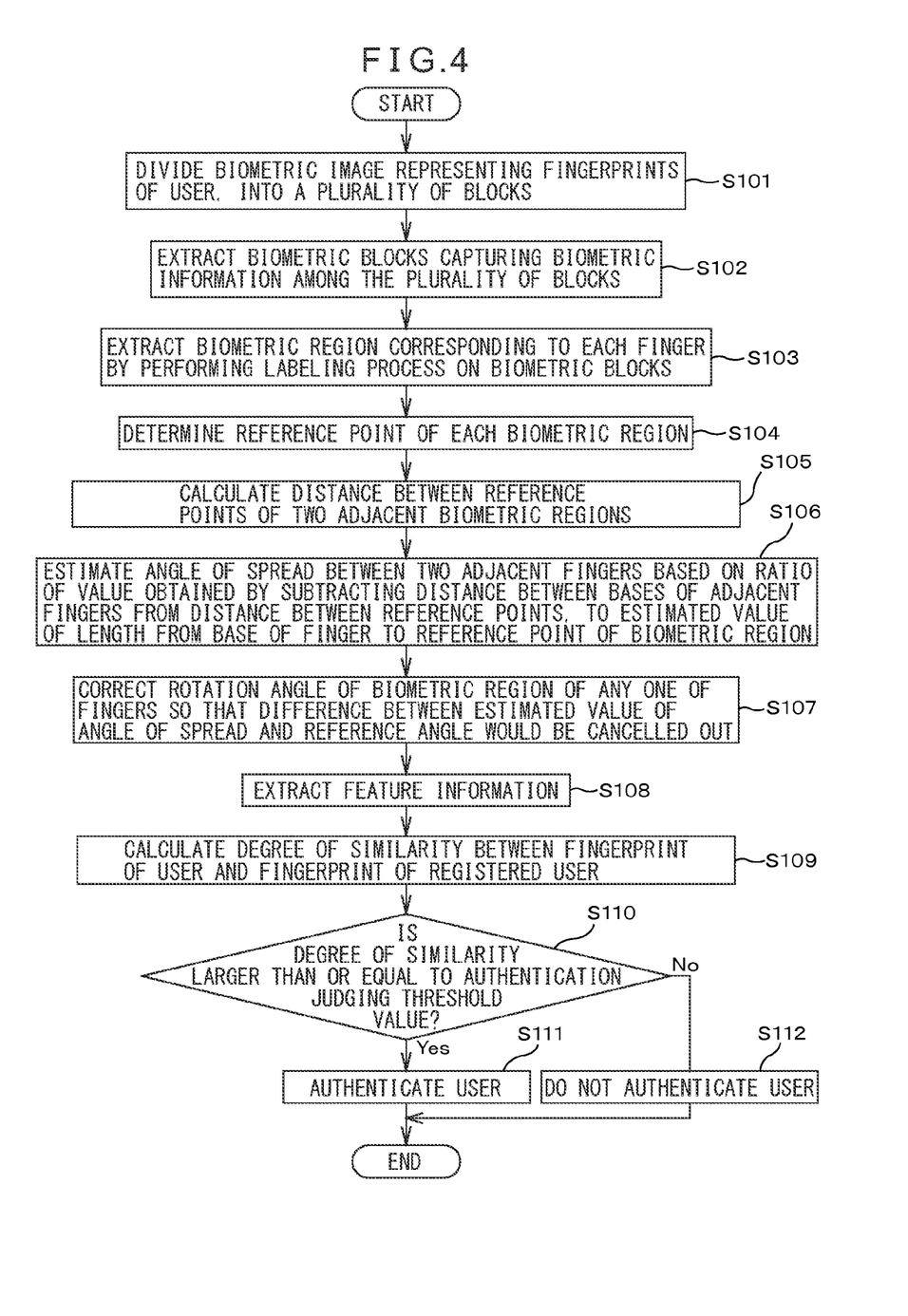
FIG. 4 is an operation flowchart illustrating a biometric authentication process.

FIG. 4 is an operation flowchart illustrating the biometric authentication process carried out by the processing unit 7.

When the processing unit 7 receives, from the biometric information acquiring unit 4, a biometric image on which biometric information of a plurality of fingers of a user is represented, the image dividing unit 11 of the processing unit 7 divides the biometric image into a plurality of blocks (step S101). The biometric region extracting unit 12 of the processing unit 7 extracts biometric blocks capturing the biometric information among the plurality of blocks (step S102). Then, the biometric region extracting unit 12 performs labeling process on the biometric blocks, and determines the biometric blocks adjacent to each other as a biometric region for one finger (step S103).

After the biometric region of each finger is extracted, the inter-biometric-region distance calculating unit 13 of the processing unit 7 obtains a reference point of each biometric region (step S104). Then, the inter-biometric-region distance calculating unit 13 calculates a distance between the reference points of two adjacent biometric regions (step S105).

After that, the spread angle estimating unit 14 of the processing unit 7 estimates an angle of spread between two adjacent fingers based on a ratio of a value obtained by subtracting a distance between the bases of the adjacent fingers from a distance between the reference points of the biometric regions, to an estimated value of a length from the base of the finger to the reference point of the biometric region of the finger (step S106). Then, the correction unit 15 of the processing unit 7 corrects a rotation angle of the biometric region of one of the fingers so that a difference between an estimated value of the angle of spread and the reference angle would be cancelled out (step S107).

The feature extracting unit 16 of the processing unit 7 obtains feature information representing a feature of the biometric information of each finger on the corrected biometric image (step S108). Then, the processing unit 7 passes the feature information to the matching unit 17 of the processing unit 7. Further, when identification information of the user is acquired via the input unit 3, the processing unit 7 reads out, from the storage unit 5, feature information of a registered user associated with identification information matching the acquired identification information, and passes the feature information to the matching unit 17. On the other hand, when no identification information of the user is entered, the processing unit 7 reads out, from the storage unit 5, feature information of all registered users, and passes, to the matching unit 17, each feature information and identification information of the corresponding registered user.

Based on the feature information of the user and the feature information of the registered user, the matching unit 17 calculates a degree of similarity between the biometric information of each finger of the user captured in the biometric image and the biometric information of the corresponding finger of the registered user (step S109). Then, the matching unit 17 passes, to the authentication judging unit 18 of the processing unit 7, the identification information of the registered user along with the degree of similarity. When an identification number of the user is not acquired, the matching unit 17 obtains the maximum value of the degree of similarity obtained for each registered user. Then, the matching unit 17 passes, to the authentication judging unit 18, identification information of a registered user corresponding to the maximum value, along with the maximum value.

The authentication judging unit 18 determines whether the degree of similarity is larger than or equal to the authentication judging threshold value (step S110).

When the degree of similarity is larger than or equal to the authentication judging threshold value (Yes in step S110), the authentication judging unit 18 authenticates the user as the registered user (step S111). On the other hand, when the degree of similarity is smaller than the authentication judging threshold value (No in step S110), the authentication judging unit 18 does not authenticate the user (step S112). After step S111 or S112, the processing unit 7 terminates the biometric authentication process.

When the biometric information acquiring unit 4 generates a biometric image in a certain period whether a user's hand is placed on the sensor surface or not, the processing unit 7 may carry out the operations in step S103 and thereafter only when the number of biometric blocks extracted in step S102 is larger than or equal to a predetermined number. When the number of biometric blocks is smaller than the predetermined number, the processing unit 7 may determine that a user's hand is not placed on the sensor surface, and may carry out the operations in step S101 and thereafter again, after receiving a new biometric image.

When the processing unit 7 carries out the registration process, the registration unit 19 may carry out a procedure for storing, in the storage unit 5, the feature information along with the identification information of the user instead of the procedure in steps S109 to S112 described above.

As has been described above, the biometric authentication apparatus estimates an angle of spread between two adjacent fingers captured in a biometric image, based on a value calculated by dividing a value obtained by subtracting a distance between the bases of the fingers from a distance between the reference points of the biometric regions of the fingers by a length from the base of the finger to the reference point of the finger. In this way, the biometric authentication apparatus estimates the angle of spread between two adjacent fingers based on a model of a human hand structure. Hence, even when the biometric information of any finger is unclear on the biometric image, the biometric authentication apparatus can accurately estimate the angle of spread. Moreover, since the biometric authentication apparatus corrects the rotation angle of the biometric region of each finger according to the estimated angle of spread, the biometric authentication apparatus can accurately correct a difference between the angles of spread at the time of registration and the time of matching.

According to a modified example, only when the angle of spread between two adjacent fingers is larger than a predetermined angle, the correction unit may correct the rotation angle of the biometric region of one of the two fingers. The predetermined angle may be set at the upper limit value of the angle of spread between fingers, not affecting accuracy of feature extraction, for example, at 10°.

According to another modified example, the angle of spread between two adjacent fingers may be used as a kind of feature information. In this case, the correction unit may be omitted. The matching unit calculates, for example, a weighting factor that takes a larger value, as an absolute value of a difference between the angle of spread between any two adjacent fingers of the plurality of fingers captured in a biometric image and the angle of spread between the two corresponding fingers captured in a registered biometric image is smaller. Then, the matching unit corrects the degree of similarity by multiplying, by the weighting factor, the degree of similarity calculated by minutia matching or pattern matching. Then, the matching unit passes the corrected degree of similarity to the authentication judging unit. In this case, for example, when an absolute value of a difference between the angles of spread between the fingers is not larger than 5°, the weighting factor is set at 1. When the absolute value of the difference is larger than a value that is n times as large as 5° (where n is a positive integer), the weighting factor is set at (1−0.1×n).

According to still another modified example, the spread angle estimating unit may estimate an angle of spread θ between two adjacent fingers according to the following equation.

$$\theta = \arctan\left(\frac{(d - \alpha)}{\eta}\right) \quad (3)$$

In the above equation, d denotes a distance between the reference points of the biometric regions corresponding to the two fingers. η denotes the number of pixels in the biometric image corresponding to a distance from the base of one of the two adjacent fingers to the reference point of the biometric information, and α denotes the number of pixels in the biometric image corresponding to a distance between the bases of the two adjacent fingers. In this example, α and η are obtained empirically and stored in the storage unit in advance.

Alternatively, the spread angle estimating unit may estimate an angle of spread θ between two adjacent fingers according to the following equation.

$$\theta = \frac{(d_h - \alpha_h)}{\eta} \quad (4)$$

In the above equation, $d_h$ denotes a horizontal component of a distance between the reference points of the biometric regions corresponding to the two fingers. η denotes the number of pixels in the biometric image corresponding to a distance from the base of one of the two adjacent fingers to the reference point of the biometric information, and $\alpha_h$ denotes the number of pixels in the biometric image corresponding to a horizontal component of a distance between the bases of the two adjacent fingers. In this example, $\alpha_h$ and η are obtained empirically and stored in the storage unit in advance. In particular, when positions of the bases of two fingers are significantly different in the vertical direction in the biometric image, as the thumb and the index finger, the spread angle estimating unit preferably uses Equation (4), which only takes into account the horizontal component of the distance.

According to still another modified example, biometric information of a finger may be a finger vein pattern. In this case, the inter-biometric-region distance calculating unit may obtain the barycenter of pixels capturing a vein, as the reference point of the biometric region corresponding to each finger. For example, when the pixels capturing a vein are darker, i.e., represented with lower brightness, than other pixels in a biometric image, the inter-biometric-region distance calculating unit binarizes each biometric region to the pixels each having a brightness value not larger than an upper limit value of the brightness value corresponding to pixels capturing a vein and the other pixels, and then, can extract the pixels capturing a vein. Then, the inter-biometric-region distance calculating unit obtains, for each biometric region, the barycenter of the pixels capturing a vein as the reference point of the biometric region.

The biometric information processing apparatus and the biometric information processing method disclosed in this specification are applicable to various kinds of apparatus or systems that perform biometric authentication process between user biometric information and registered biometric information in advance in order to permit a user to perform some kind of operation.

Figure 5:
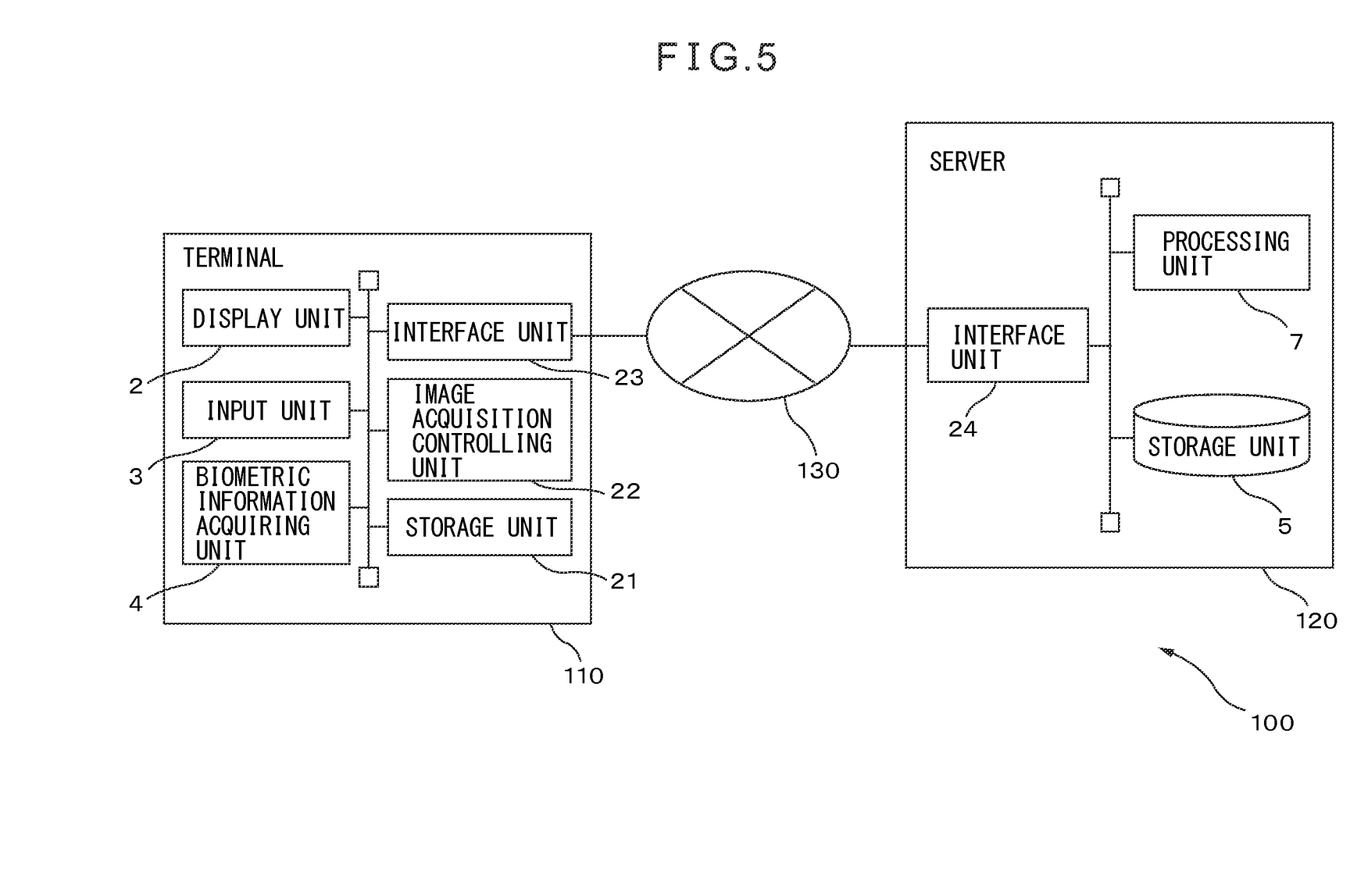
FIG. 5 is a schematic diagram illustrating a configuration of an example of a computer system in which the biometric information processing apparatus according to the embodiment or any one of modified examples of the embodiment is incorporated.

FIG. 5 is a schematic diagram illustrating a configuration of an example of a computer system in which the biometric information processing apparatus according to the above-described embodiment or the modified examples of the embodiment is incorporated. For example, a computer system 100 includes at least one terminal 110 and a server 120. The terminal 110 and the server 120 are connected via a wired or wireless communication network 130. Note that, in FIG. 5, among components included in the computer system 100, a component corresponding to any of components included in the biometric authentication apparatus 1 illustrated in FIG. 1 is denoted by the same reference number as the component included in the biometric authentication apparatus 1.

In this system, the terminal 110 is, for example, a mobile terminal such as a mobile phone and a tablet, or a stationary terminal, and includes a display unit 2, an input unit 3, and a biometric information acquiring unit 4. The terminal 110 also includes a storage unit 21, an image acquisition controlling unit 22, and an interface unit 23.

The storage unit 21 includes, for example, a semiconductor memory circuit, and temporarily stores a biometric image generated by the biometric information acquiring unit 4. The image acquisition controlling unit 22 includes one or more processors and peripheral circuits thereof, controls each unit of the terminal 110, and executes various kinds of programs that operate on the terminal 110. Then, the image acquisition controlling unit 22 transmits the biometric image generated by the biometric information acquiring unit 4 and capturing biometric information of a plurality of fingers, to the server 120 via the interface unit 23 including an interface circuit for connecting the terminal 110 to the communication network 130. The image acquisition controlling unit 22 may also transmit user identification information entered via the input unit 3, to the server 120.

The server 120 includes a storage unit 5, a processing unit 7, and an interface unit 24 including an interface circuit for connecting the server 120 to the communication network 130. The processing unit 7 of the server 120 carries out the biometric authentication process by implementing each function incorporated in the processing unit according to the above-described embodiment or the modified examples of the embodiment, by using the biometric image received via the interface unit 24. Then, the server 120 returns a result of determination indicating whether the authentication succeeds or not, to the terminal 110 via the interface unit 24.

Alternatively, the image acquisition controlling unit 22 of the terminal 110 may carry out processes of the image dividing unit, the biometric region extracting unit, the inter-biometric-region distance calculating unit, the spread angle estimating unit, the correction unit, and the feature extracting unit among functions of the processing unit according to the above-described embodiment. In this case, feature information extracted from a biometric image of a user and identification information of the user may be transmitted from the terminal 110 to the server 120. Meanwhile, the processing unit 7 of the server 120 carries out only processes of the matching unit, the authentication judging unit, and the registration unit among functions of the processing unit according to the above-described embodiment. In this way, load on the server 120 is reduced, and hence the computer system 100 can prevent the time for the user to wait from increasing, even when a number of biometric authentication processes are performed at the same time.

A computer program including instructions for causing a computer to implement functions of the processing unit according to the above-described embodiment may be provided in the form recorded on a recording medium such as a magnetic recording medium, an optical recording medium, and a nonvolatile semiconductor memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A biometric information processing apparatus comprising:
   a biometric information acquiring unit that generates a biometric image representing biometric information of a plurality of fingers of a user; and
   a processor adapted to extract a biometric region capturing biometric information of each of the plurality of fingers in the biometric image;
   obtain a first distance between the biometric regions corresponding to two adjacent fingers of the plurality of fingers; and
   estimate an angle of spread between the two adjacent fingers according to a ratio of a value obtained by subtracting a distance between bases of the two fingers from the first distance, to a length from a base of one of the two adjacent fingers to the biometric information.

2. The biometric information processing apparatus according to claim 1, further comprising:
   a storage unit that stores, for at least one registered user, a registered feature extracted from a registered biometric image capturing biometric information of the plurality of fingers of the registered user and representing a feature of the biometric information, and a reference angle representing an angle of spread between two adjacent fingers of the plurality of fingers; wherein
the processor further adapted to correct the biometric image by rotating the biometric region of at least one of the two fingers of the plurality of fingers captured in the biometric image in such a way that a difference between the angle of spread estimated between the two fingers and the reference angle is cancelled out;
extract an input feature representing a feature of the biometric information of the user from the corrected biometric image; and
obtain a degree of similarity between the biometric information of the user and the biometric information of the registered user based on the input feature and the registered feature.

3. The biometric information processing apparatus according to claim 1, further comprising:
a storage unit that stores, for at least one registered user, a registered feature extracted from a registered biometric image capturing biometric information of the plurality of fingers of the registered user and representing a feature of the biometric information, and a reference angle representing an angle of spread between two adjacent fingers of the plurality of fingers; wherein
the processor further adapted to extract an input feature representing a feature of the biometric information of the user, from the biometric image; and
obtain a degree of similarity between the biometric information of the user and the biometric information of the registered user based on the input feature and the registered feature, wherein
the obtaining the degree of similarity causes the degree of similarity to be higher as a difference between an angle of spread between the two fingers of the user estimated from the biometric image and the reference angle is smaller.

4. The biometric information processing apparatus according to claim 1, further comprising:
an input unit that acquires identification information of a user;
a storage unit; wherein
the processor further adapted to correct the biometric image by rotating the biometric region of at least one of the two fingers of the plurality of fingers captured in the biometric image in such a way that a difference between the angle of spread estimated between the two fingers and a predetermined reference angle is cancelled out;
extract an input feature representing a feature of the biometric information of the user from the corrected biometric image; and
cause the storage unit to store the input feature along with identification information of the user.

5. The information processing apparatus according to claim 1, wherein
the biometric information is a fingerprint, and
the obtaining the first distance obtains a position of a singular point of a fingerprint in the biometric region of each of the two fingers, and calculates a distance between the singular points of the two respective fingers as the first distance.

6. A biometric information processing method comprising:
generating a biometric image representing biometric information of a plurality of fingers of a user by a biometric information acquiring unit;
extracting a biometric region capturing biometric information of each of the plurality of fingers in the biometric image by a processor;
obtaining a first distance between the biometric regions corresponding to two adjacent fingers of the plurality of fingers by the processor; and
estimating an angle of spread between the two adjacent fingers according to a ratio of a value obtained by subtracting a distance between bases of the two fingers from the first distance, to a length from a base of one of the two adjacent fingers to the biometric information by the processor.

7. The biometric information processing method according to claim 6, further comprising:
correcting the biometric image by rotating the biometric region of at least one of the two fingers of the plurality of fingers captured in the biometric image in such a way that a difference between the angle of spread estimated between the two fingers and a reference angle representing an angle of spread between two adjacent fingers of the plurality of fingers is cancelled out by the processor;
extracting an input feature representing a feature of the biometric information of the user from the corrected biometric image by the processor; and
obtain a degree of similarity between the biometric information of the user and the biometric information of a registered user based on the input feature and a registered feature extracted from a registered biometric image capturing biometric information of the plurality of fingers of the registered user and representing a feature of the biometric information.

8. The biometric information processing method according to claim 6, further comprising:
extracting an input feature representing a feature of the biometric information of the user, from the biometric image by the processor; and
obtaining a degree of similarity between the biometric information of the user and the biometric information of a registered user based on the input feature and a registered feature extracted from a registered biometric image capturing biometric information of the plurality of fingers of the registered user and representing a feature of the biometric information, wherein
the obtaining the degree of similarity causes the degree of similarity to be higher as a difference between an angle of spread between the two fingers of the user estimated from the biometric image and a reference angle representing an angle of spread between two adjacent fingers of the plurality of fingers is smaller.

9. The biometric information processing method according to claim 6, further comprising:
correcting the biometric image by rotating the biometric region of at least one of the two fingers of the plurality of fingers captured in the biometric image in such a way that a difference between the angle of spread estimated between the two fingers and a predetermined reference angle is cancelled out;
extracting an input feature representing a feature of the biometric information of the user from the corrected biometric image; and
causing a storage unit to store the input feature along with identification information of the user.

10. The information processing method according to claim 6, wherein
the biometric information is a fingerprint, and
the obtaining the first distance obtains a position of a singular point of a fingerprint in the biometric region of each of the two fingers, and calculates a distance between the singular points of the two respective fingers as the first distance.

11. A non-transitory computer-readable recording medium having recorded thereon a biometric information processing computer program that causes a computer to execute a process comprising:
- extracting a biometric region capturing biometric information of each of a plurality of fingers of a user, in a biometric image representing biometric information of the plurality of fingers;
- obtaining a first distance between the biometric regions corresponding to two adjacent fingers of the plurality of fingers; and
- estimating an angle of spread between the two adjacent fingers according to a ratio of a value obtained by subtracting a distance between bases of the two fingers from the first distance, to a length from a base of one of the two adjacent fingers to the biometric information.

* * * * *